United States Patent [19]

Schedin

[11] Patent Number: 5,178,092
[45] Date of Patent: Jan. 12, 1993

[54] BRAKE ADJUSTMENT INDICATOR

[76] Inventor: Kenneth C. Schedin, 17038 SW. Pacific Hwy. #H-291, Tigard, Oreg. 97224

[21] Appl. No.: 739,090
[22] Filed: Aug. 1, 1991
[51] Int. Cl.⁵ .......................................... F16D 66/02
[52] U.S. Cl. ................................ 116/208; 116/283; 188/1.11
[58] Field of Search .................. 116/208, 281, 283; 188/1.11

[56] References Cited

U.S. PATENT DOCUMENTS

| | | | |
|---|---|---|---|
| 1,569,133 | 1/1926 | Ostrander | 116/283 |
| 3,362,115 | 1/1968 | Nyhus et al. | 52/147 |
| 4,279,214 | 7/1981 | Thorn | 116/208 |
| 4,945,818 | 8/1990 | Ware | 92/5 R |
| 4,989,537 | 2/1991 | Hutchinson, Sr. et al. | 116/208 |
| 5,038,705 | 8/1991 | Shapiro et al. | 116/209 |

Primary Examiner—William A. Cuchlinski, Jr.
Assistant Examiner—W. Morris Worth
Attorney, Agent, or Firm—Marger, Johnson, McCollom & Stolowitz

[57] ABSTRACT

Disclosed is a brake adjustment indicator which is suited for the retrofit installation on pneumatic or the like brakes systems. The indicator comprises of a plastic scratch resistant sleeve that is of three colors and fits securely over the push rod of the pneumatic actuator between the push rod attachment at the diaphragm and the clevis locking nut at the slack adjuster. The sleeve has an outside diameter permitting it to be received in the aperture of the ambient brake chamber which receives the push rod. The inside diameter of the sleeve is that of the outside diameter of the push rod. The memory of the plastic material holds the indicator on the push rod. The length of the indicator is that of the push rod between the attachment at the diaphragm and the locking nut of the clevis at the slack adjuster, with color lengths corresponding to type of application and design. When the brake is applied the sleeve travel observed outside the brake chamber is the same as that of the push rod. The colors observed determine distance of travel and status of brake adjustment, thus providing an easier and more frequent inspection of brake adjustment resulting in better brake maintenance and safer operation.

2 Claims, 3 Drawing Sheets

BRAKE ADJUSTMENT INDICATOR

BACKGROUND OF THE INVENTION

1. Field of Invention

This invention relates to improvements in a brake system inspection process and in particular to a brake adjustment indicator useful in inspecting a vehicle pneumatic brake system.

2. Brief Statement of the Prior Art

Braking systems commonly used on trucks and trailers are air pressure actuated. The actuator is an air pressure chamber and flexible diaphragm linked mechanically to the brake by a push rod. The travel of the push rod increases as the brake member, such as a brake pad or brake shoe lining, wears from use. In the common pneumatic brake system on trucks and trailers, the brake actuator is visible. A common practice for determining brake adjustment is to measure push rod travel by marking the push rod at the aperture of the brake chamber while in the most retracted position. The brakes are then applied and a measurement of the push rod travel is then taken to determine if the adjustment is within the limits set by vehicle operational codes.

These brake systems are difficult to inspect and require more than one person to obtain the measurement of the travel of the push rod, limiting the frequency of this type of inspection, ultimately presenting a potentially hazardous condition.

BRIEF STATEMENT OF THE INVENTION

This invention comprises of a brake adjustment indicator which can be installed upon the push rod of the brake actuator indicating amount of travel of the push rod. The invention comprises of a one-piece three-color split sleeve that fits securely over the push rod between the diaphragm attachment of the push rod and the clevis locking nut at the slack adjuster. As the travel of the push rod increases the indicator color would correspond with the status of brake adjustment. Green indicates proper adjustment limits, Yellow indicates adjustment nearing maximum allowed travel, Red indicates improper adjustment. One can easily observe the brake adjustment during the braking system brakes-on inspection, or when spring brake parking brake is applied.

BRIEF DESCRIPTION OF THE DRAWINGS

The invention will be described with reference to the figures of which.

DESCRIPTION OF EMBODIMENTS

Figure 1A:
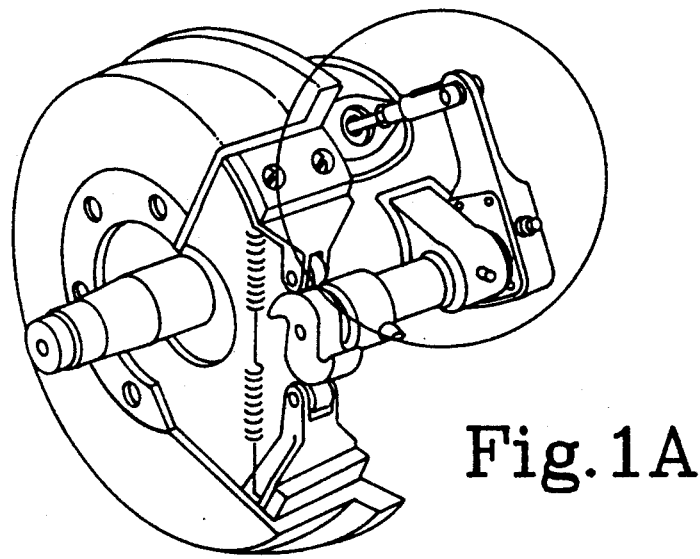
FIG. 1 illustrates view of braking assembly. Brake actuating system identified.
Figure 1B:
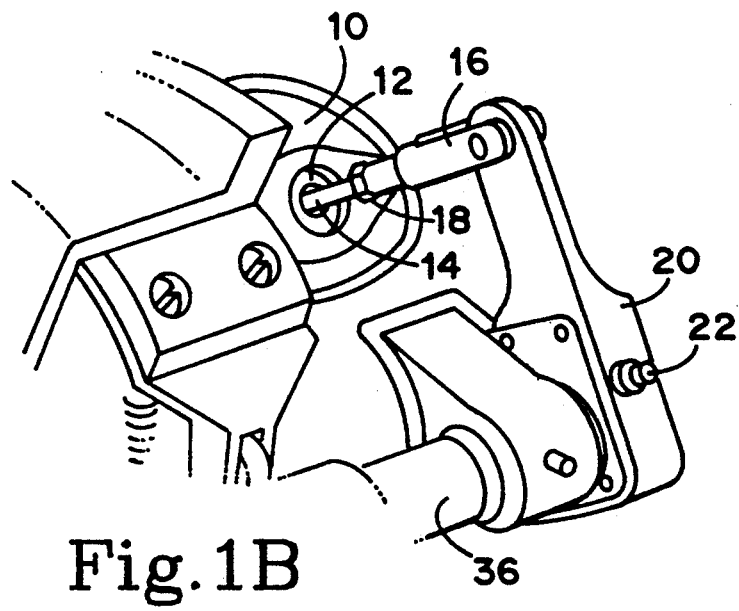

Referring to FIG. 1, there is illustrated a typical braking assembly. As illustrated the brake actuator comprises a brake chamber housing 10 aperture 12 actuating push rod 14 clevis 16 clevis locking nut 18 slack adjuster 20 slack adjuster adjustment bolt 22 and shaft 36.

Figure 2:
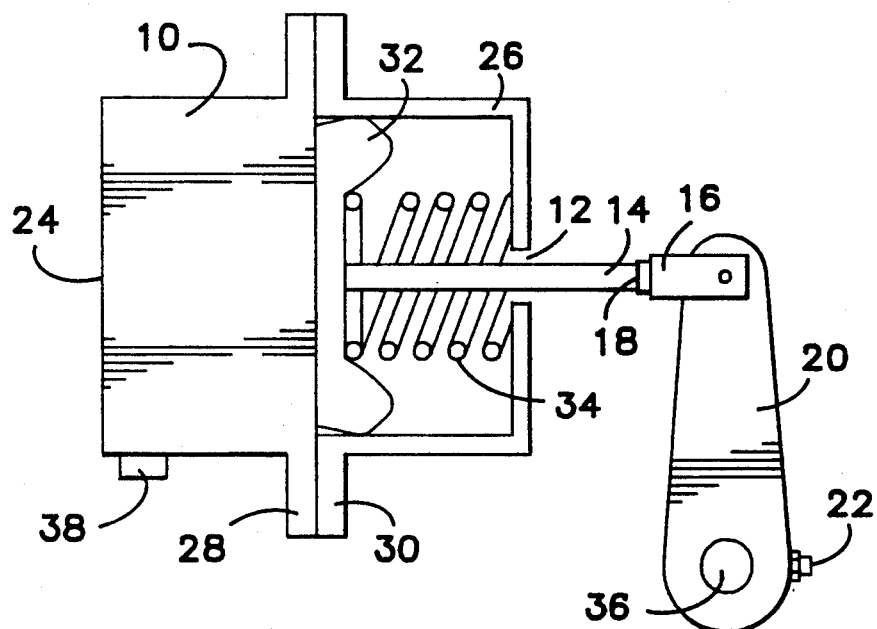
FIG. 2 illustrates brake chamber with actuator in retracted position.

Referring to FIG. 2, the typical brake chamber housing 10 is formed of first and second halves 24 and 26 divided by a flexible diaphragm 32 secured by the flanges 28 and 30 of halves 24 and 26. The first half 24 being the pressure chamber, and the second half 26 being the ambient chamber, the latter having a central aperture 12 for receiving the push rod 14. The ambient chamber 26 typically contains a resilient means such as a compression spring 34. The spring 34 returns the flexible diaphragm 32 to its most retracted position as shown in FIG. 2. The push rod 14 is attached to the flexible diaphragm 32 and attaches to slack adjuster 20 with pinned clevis 16. The slack adjuster is coupled to shaft 36 by an adjustment bolt 22 whereby the angle of the slack adjuster 20 on shaft 36 is fixedly adjustable. The pressure chamber 24 of the chamber housing 10 has a supply port 38 connected through flexible tubing and the like to the pneumatic system through a valve mechanism responsive to brake pedal movement.

Figure 3:
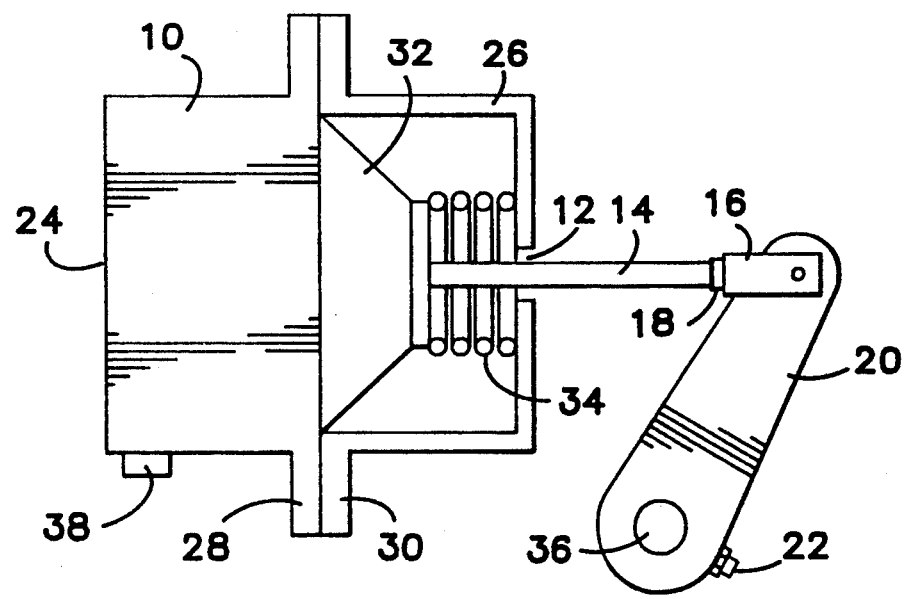
FIG. 3 illustrates brake chamber of FIG. 2 in a braking application.

Referring to FIG. 3, the typical pneumatic brake system shown in the brakes-on position. As illustrated the flexible diaphragm 32 has moved under force of air pressure admitted into pressure chamber 24 and compressing spring 34 advancing push rod 14 to rotate slack adjuster 20 and apply the brake. The extent of the travel of the push rod 14 is limited by the seating of the brake shoe lining or pad against the brake drum or brake disk. The extent of push rod 14 travel is a direct indication of brake adjustment, and for this reason, is used in code specifications on permissible safe and unsafe brake adjustment.

In most brake actuators, the push rod 14 is received through a substantially larger center aperture 12 in the ambient chamber 26 of the chamber housing 10. This construction allows retrofitting with my invention illustrated in FIG. 4 over and around push rod 14.

Figure 4:
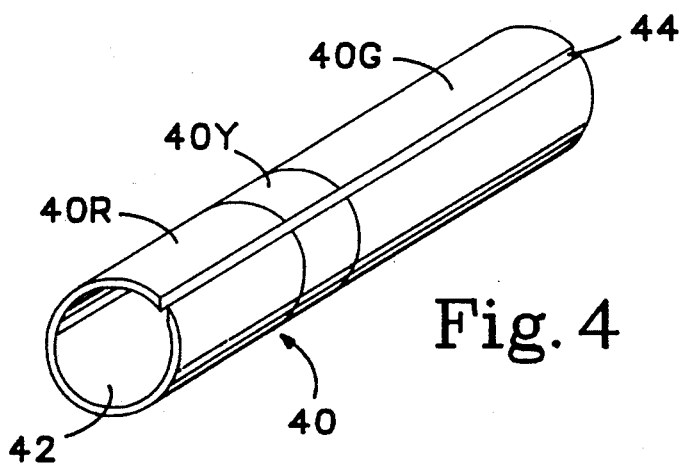
FIG. 4 is the perspective of the invention.

Referring to FIG. 4, my invention comprises a sleeve 40 having an inside diameter 42 which is the same as the outside diameter of push rod 14. The outside diameter of the sleeve 40 is sufficient to be received into the center aperture 12 of the ambient chamber 26, without interfering with the movement of push rod 14. The length of the sleeve 40 is the distance between the attachment of push rod 14 to flexible diaphragm 32 and the clevis locking nut 18. The sleeve 40 is split 44 in a straight line longitudinally allowing installation of sleeve 40 over and around push rod 14. The sleeve 40 is color coded green 40G, yellow 40Y, red 40R. The color coding of sleeve 40 is determined by the type and application of each brake system and corresponds with the adjustment of the brake determined by the amount of travel of the push rod 14. The color green 40G indicates safe and acceptable adjustment, yellow 40Y is a narrower band indicating adjustment required, red 40R indicates unsafe and unacceptable adjustment.

Figure 5:
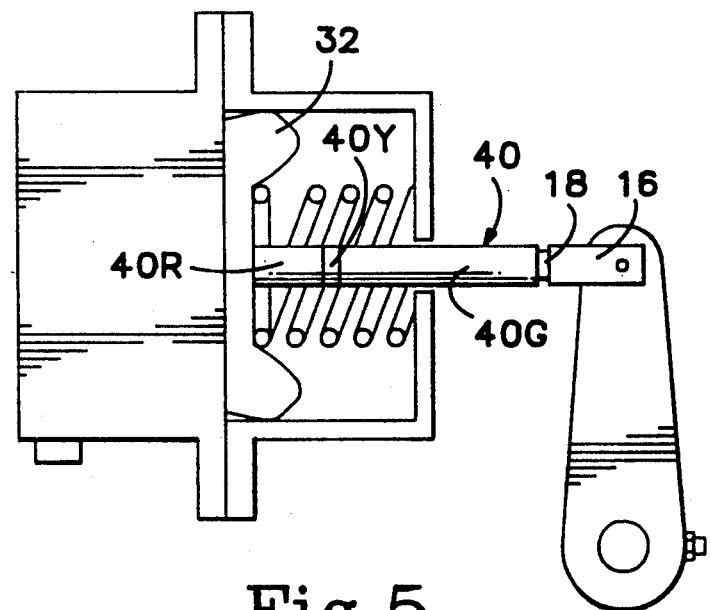
FIG. 5 illustrates brake chamber of FIG. 2 with invention as initially installed on the push rod.

Referring to FIG. 5, sleeve 40, the invention, is shown as initially installed over and around push rod between flexible diaphragm 32 and clevis locking nut 18, and is fully retracted within ambient chamber 26.

Figure 6:
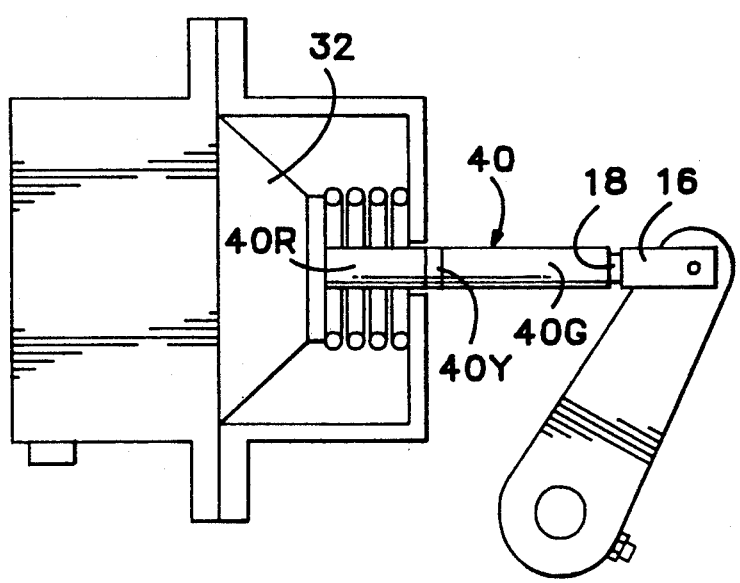
FIG. 6 illustrates brake chamber of FIG. 3 with invention as initially installed on the push rod in a braking application.

Referring to FIG. 6, sleeve 40, the invention, is shown as initially installed over and around push rod between flexible diaphragm 32 and clevis locking nut 18, and is in fully extended brake on position. When the brake is applied the flexible diaphragm 32 moves to the position shown. Sleeve 40 is easily observed as it extends outside of the ambient chamber 26. The full distance of the travel of push rod to a point of brake member seat, is the extent of travel of sleeve 40 and can then be easily and directly observed without a mechanical measurement being made.

What is claimed:

1. An air brake adjustment indicator for indicating the adjustment of an air brake system, the air brake system including an elongate push rod having a first end portion connected to a diaphragm disposed within an air brake housing and a second end portion extending outwardly of the air brake housing through an aperture formed therein, a central portion of the push rod being reversibly movable outwardly through the aperture to a brake on position responsive to air pressure changes within the air brake housing, said air brake adjustment indicator comprising:

a unitary resilient sleeve for covering a portion of an elongate air brake push rod, the push rod having a first end within an air brake housing, a second end outside said airbrake housing, and a central portion for being reversibly moved outwardly of the air brake housing through an aperture in an outer wall thereof when the push rod is reversibly moved from a brake off position to a brake on position;

said sleeve having a longitudinal dimension substantially equal to a distance between said push rod first and second ends;

said resilient sleeve having a pair of opposed longitudinal edges forming a longitudinal slit along the length of said sleeve;

said pair of longitudinal edges being movable to a first position spaced apart from one another for mounting said sleeve on the push rod;

said pair of longitudinal edges being urged together by said resilient sleeve toward a second position parallel and adjacent to one another;

said resilient sleeve having an outer diameter when mounted which is less than an inner diameter of said air brake housing aperture, said sleeve and said aperture defining an annular space therebetween, said sleeve and said central push rod portion being reversibly movable together through said aperture;

a first colored band on said resilient sleeve which, when said air brake system is properly adjusted and said push rod is moved to a brake on position, is visible outwardly of of said aperture of said air brake housing for visually indicating a properly adjusted air brake system to a person viewing the air brake system; and a second differently colored circumferential band on said resilient sleeve which is colored differently from said first colored band, and which, when said air brake system is improperly adjusted and said push rod is moved to said brake on position, is moved outwardly through said aperture to a position outside of said air brake housing for visually indicating an improperly adjusted air brake system to a person viewing the air brake system.

2. An air brake adjustment indicator according to claim 1 which further comprises a third colored band, colored differently from said first and second colored bands, and which, when said air brake system is improperly adjusted beyond a safety limit and when said push rod is moved to said brake on position, is moved outwardly through said aperture to a position outside of said air brake housing for visually indicating an improper adjustment beyond a safety limit to a person viewing the air brake system.

* * * * *